(12) United States Patent
Huang et al.

(10) Patent No.: US 8,555,269 B2
(45) Date of Patent: *Oct. 8, 2013

(54) SYSTEM AND METHOD FOR SECURING WEB APPLICATION CODE AND VERIFYING CORRECTNESS OF SOFTWARE

(75) Inventors: Yao-Wen Huang, Taipei (TW); Fang Yu, Taipei (TW); Chung-Hung Tsai, Chiayi (TW); Christian Hang, Wesel (DE); Der-Tsai Lee, Wilmette, IL (US); Sy-Yen Kuo, Taipei (TW)

(73) Assignee: Armorize Technologies, Inc., Santa Clara, CA (US)

( * ) Notice: Subject to any disclaimer, the term of this patent is extended or adjusted under 35 U.S.C. 154(b) by 411 days.

This patent is subject to a terminal disclaimer.

(21) Appl. No.: 12/850,817

(22) Filed: Aug. 5, 2010

(65) Prior Publication Data

US 2011/0197180 A1 Aug. 11, 2011

Related U.S. Application Data

(63) Continuation of application No. 11/435,232, filed on May 16, 2006, now Pat. No. 7,779,399.

(60) Provisional application No. 60/681,505, filed on May 16, 2005.

(51) Int. Cl.
*G06F 9/45* (2006.01)

(52) U.S. Cl.
USPC .................... 717/154; 717/131; 717/152

(58) Field of Classification Search
USPC .................... 717/130–133, 152–158
See application file for complete search history.

(56) References Cited

U.S. PATENT DOCUMENTS

| 5,535,393 | A | * | 7/1996 | Reeve et al. ............ 717/149 |
| 5,655,122 | A | | 8/1997 | Wu |
| 5,832,271 | A | | 11/1998 | Devanbu |
| 5,862,382 | A | | 1/1999 | Kataoka |
| 6,014,518 | A | | 1/2000 | Steensgaard |
| 6,048,099 | A | | 4/2000 | Muffett et al. |
| 6,077,313 | A | | 6/2000 | Ruf |
| 6,317,869 | B1 | * | 11/2001 | Adl-Tabatabai et al. ...... 717/132 |
| 6,343,375 | B1 | | 1/2002 | Gupta et al. |
| 6,820,256 | B2 | | 11/2004 | Fleehart et al. |
| 6,823,507 | B1 | | 11/2004 | Srinivasan et al. |
| 6,865,730 | B1 | | 3/2005 | Burke et al. |
| 6,925,638 | B1 | * | 8/2005 | Koved et al. ............ 717/155 |
| 7,013,456 | B1 | * | 3/2006 | Van Dyke et al. ............ 717/130 |
| 7,058,928 | B2 | | 6/2006 | Wygodny et al. |
| 7,069,545 | B2 | | 6/2006 | Wang et al. |

(Continued)

OTHER PUBLICATIONS

Heckmann et al, "Verifying Safety-Critical Timing and Memory-Usage Properties of Embedded Software by Abstract Interpretation", IEEE, pp. 1-2, 2005.*

(Continued)

*Primary Examiner* — Anil Khatri
(74) *Attorney, Agent, or Firm* — Potomac Patent Group, PLLC (57) ABSTRACT

Methods, software tools and systems for analyzing software applications, e.g., Web applications, are described. A software application to be analyzed is transformed into an abstract representation which preserves its information flow properties. The abstract interpretation is evaluated to identify vulnerabilities using, for example, type qualifiers to associate security levels with variables and/or functions in the application being analyzed and typestate checking. Runtime guards are inserted into the application to secure identified vulnerabilities.

23 Claims, 8 Drawing Sheets

(56) References Cited

U.S. PATENT DOCUMENTS

| | | | |
|---|---|---|---|
| 7,111,290 B1 * | 9/2006 | Yates et al. | 717/158 |
| 7,137,110 B1 * | 11/2006 | Reese et al. | 717/158 |
| 7,181,733 B2 | 2/2007 | Sarcar | |
| 7,181,737 B2 * | 2/2007 | de Jong et al. | 717/154 |
| 7,185,327 B2 | 2/2007 | Scales | |
| 7,210,135 B2 | 4/2007 | McCrady et al. | |
| 7,281,242 B2 | 10/2007 | Inamdar | |
| 7,313,789 B1 | 12/2007 | Yellin et al. | |
| 7,500,230 B2 | 3/2009 | Edwards et al. | |
| 7,506,330 B2 * | 3/2009 | Alexander et al. | 717/157 |
| 7,552,428 B2 * | 6/2009 | Stoodley et al. | 717/148 |
| 7,571,434 B1 * | 8/2009 | Kamen et al. | 717/154 |
| 7,600,223 B2 * | 10/2009 | Massarenti et al. | 717/152 |
| 7,673,051 B2 | 3/2010 | Kaplan et al. | |
| 7,818,721 B2 * | 10/2010 | Sundararajan et al. | 717/130 |
| 7,913,240 B2 * | 3/2011 | Kielstra et al. | 717/148 |
| 7,926,048 B2 * | 4/2011 | Bratanov | 717/155 |
| 8,327,339 B2 * | 12/2012 | Scholz et al. | 717/132 |
| 8,347,392 B2 * | 1/2013 | Chess et al. | 726/25 |
| 8,458,684 B2 * | 6/2013 | Eichenberger et al. | 717/159 |

OTHER PUBLICATIONS

Blanchet et al, "A Static Analyzer for Large SafetyCritical Software", ACM PLDI, pp. 196-207, 2003.*

Jhala et al, "Software Model Checking", ACM Computing Survey, vol. 41, No. 4, article 21, pp. 1-54, 2009.*

Seo et al, "Goal-Directed Weakening of Abstract Interpretation Results" ACM Trans. on Prog. Lang. and Sys. vol. 29, No. 6, article 39, pp. 1-39, 2007.*

Chvatal, V. (1979) "A Greedy Heuristic for the Set Covering Problem." Mathematics of Operations Research. 4, 33-235.

Clarke, E., et al. "Behavioral Consistency of C and Verilog Programs Using Bounded Model Checking." Anaheim, California: Annual ACM IEEE Design Automation Conference, Proceedings of the 40th Conference on Design Automation. DAC 2003: Jun. 2-6, 2003, 368-371.

Denning, D. E., et al. (May 1976). "A Lattice Model of Secure Information Flow." Communications of the ACM, 19(5), 236-243.

Huang, Y., et al. "Securing Web Application Code by Static Analysis and Runtime Protection." New York, New York: The Thirteenth International World Wide Web Conference. May 17-22, 2004, 40-51.

Huang, Y., et al. "Verifying Web Application Using Bounded Model Checking." Florence, Italy: The International Conference on Dependable Systems and Networks. DSN 2004: Jun. 28-Jul. 1, 2004, 199-208.

Moskewicz, Matthew W., et al. "Chaff: Engineering an Efficient SAT Solver." Retrieved Sep. 17, 2008 from Princeton University. Web site: http://www.princeton.edu/~chaff/publication/DAC2001v56.pdf.

Scott, D. et al. "Abstracting Application-Level Web Security." Honolulu, Hawaii: The Eleventh International World Wide Web Conference. May 2002. Web site: http://www2002.org/CDROM/refereed/48/.

Strom, et al. (1986) "Typestate: A Programming Language Concept for Enhancing Software Reliability." IEEE Transactions on Software Engineering. 12(a), 157-171.

Barbuti et al., "Checking security of Java bytecode by abstract interpretation," ACM SAC, pp. 229-236, 2002.

Lokuciejewski et al., "A fast and precise static loop analysis based on abstract interpretation program slicing and polytope models," IEEE, pp. 136-146, 2009.

Midtgaard et al., "Control flow analysis of function calls and returns by abstract interpretation," ACM ICFP, p. 287-298, 2009.

Cidish et al., "Improving abstract interpretations by combining domains," ACM Trans. on Prog. Lang & Sys. vol. 17, No. 1, pp. 28-44, 1995.

* cited by examiner

```
$month=$_GET['month']; $year=$_GET['year'];
$day=$_GET['day'];
echo "<a href=\"day.php?year=$year&"
echo "month=$month&day=$day\">";
```

FIG. 1A

```
<a href= "day.php?year=><script>malicious_script();</script>
```

FIG. 1B

```
$sql="INSERT INTO tracking_temp ".
"VALUES('$HTTP_REFERER');";    mysql_query($sql);
```

FIG. 2

```
$csvfile = $_POST['csvfile'];
if($_POST['action'] == 'download') $fp=fopen($csvfile, 'rb');
```

| Filtered Result: $F(p)$ | Abstract Interpretation: $AI(F(p))$ |
|---|---|
| $x = e;$ | $t_x = t_e$, where $t_n = \bot$, $t_{e_i} \sim e_j = t_{e_i} \sqcap t_{e_j}$ |
| $fi(X);$ | $\forall_{x \in X} t_x = \tau$, where $\tau$ depends on the postconditions of $fi$ |
| $fo(X);$ | $assert\ (X, \tau_r)$, where $\tau_r$ depends on the preconditions of $fo$ |
| stop; | stop; |
| if $e$ then $c_1$ else $c_2$ | if $b_e$ then $AI(c_1)$ else $AI(c_2)$ |
| while $e$ do $c$ | if $b_e$ then $AI(c)$ |
| $c_1; c_2$ | $AI(c_1); AI(c_2)$ |

SYSTEM AND METHOD FOR SECURING WEB APPLICATION CODE AND VERIFYING CORRECTNESS OF SOFTWARE

RELATED APPLICATION

This application is a continuation of U.S. application Ser. No. 11/435,232 filed May 16, 2006 now U.S. Pat. No. 7,779, 399 which is related to, and claims priority from, U.S. Provisional Patent Application Ser. No. 60/681,505 filed on May 16, 2005, entitled "Systems and Methods for Securing Web Application Code", the disclosure of which is incorporated here by reference.

BACKGROUND

The present invention relates generally to software applications and, more particularly, to mechanisms for securing Web-based (Internet) applications. Note that the terms "java", "JavaCC", and "JavaScript" used herein are trademarks of Sun Microsystems.

As more and more services are provided via the World Wide Web, efforts from both academia and industry are striving to create technologies and standards that meet the sophisticated requirements of today's Web applications and users. In many situations, security remains a major roadblock to universal acceptance of the Web for all kinds of transactions. According to one report, during 2002 there was an 81.5% increase in documented vulnerabilities overall, a large portion of which were vulnerabilities associated with Web applications. The report's authors pointed out that the driving force behind this trend is the rapid development and deployment of remotely exploitable Web applications.

Current technologies, such as anti-virus software programs and network firewalls, offer comparatively secure protection at the host and network levels, but not at the application level. However, when network and host-level entry points become relatively secure, the public interfaces of Web applications are likely to become focus of security concerns.

Figure 1A:
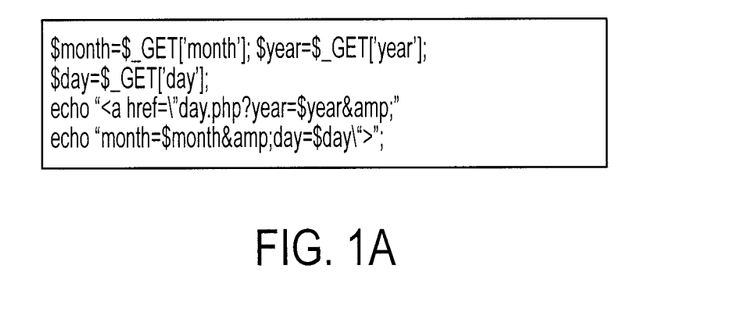
Figure 1B:
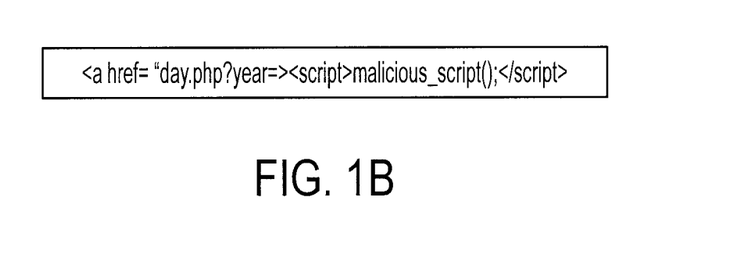

Cross-site scripting (XSS) is perhaps the most common Web application vulnerability. FIG. 1(a) shows an example of an XSS vulnerability in an application written in PHP (PHP: Hypertext Preprocessor, one of the most widely-used programming language for Web application development) code. Values for the variables $month, $day, and $year in the application code of FIG. 1(a) come from HTTP requests and are used to construct HTML output sent to the user. An example of an attacking URL associated with the code in FIG. 1(a) would be: http://www.target.com/event_delete.php?year=><script>malicious_script( );</script≥ in which attackers seek to make victims open by attacking URLs. One strategy is to send an e-mail containing JAVASCRIPT™ that secretly launches a hidden browser window to open this URL. Another is to embed the same JAVASCRIPT™ inside a Web page; when victims open the page, the script executes and secretly opens the URL. Once the PHP code shown in FIG. 1(a) receives an HTTP request for the URL, it generates the compromised HTML output shown in FIG. 1(b).

The compromised output contains malicious script prepared by an attacker and delivered on behalf of a Web server. HTML output integrity is hence broken and the JAVASCRIPT™ Same Origin Policy is violated. Since the malicious script is delivered on behalf of the Web server, it is granted the same trust level as the Web server, which at minimum allows the script to read user cookies set by that server. This often reveals passwords or allows for session hijacking; if the Web server is registered in the Trusted Domain of the victim's browser, other rights (e.g., local file system access) may be granted as well.

Figure 2:
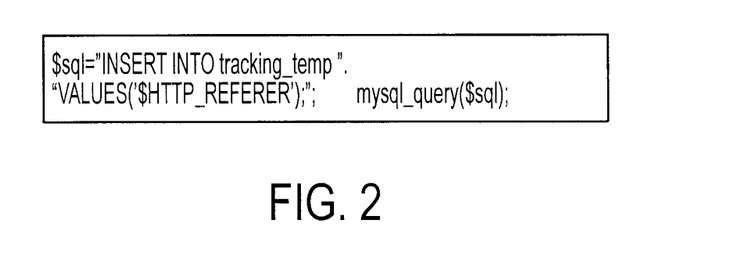

Considered more severe than XSS attacks, SQL injection vulnerabilities occur when untrusted values are used to construct SQL commands, resulting in the execution of arbitrary SQL commands given by an attacker. An example of an SQL vulnerability is illustrated in FIG. 2. Therein, $HTTP_REFERER is used to construct a SQL command. The referer field of a HTTP request is an untrusted value given by the HTTP client; an attacker can set the field to: ');DROP TABLE ('users This will cause the code in FIG. 2 to construct the $sql variable as:
INSERT INTO tracking_temp VALUES('');
DROP TABLE ('users');
Table "users" will be dropped when this SQL command is executed. This technique, which allows for the arbitrary manipulation of a backend database, is responsible for the majority of successful Web application attacks.

Figure 3:
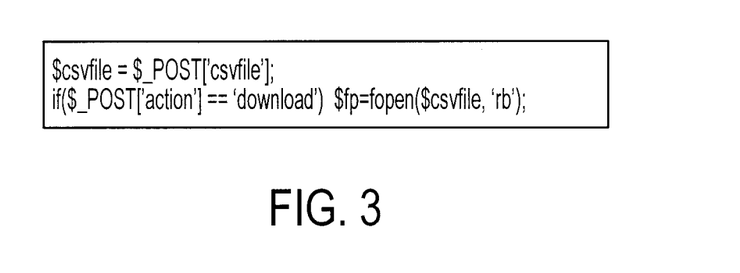

Yet another type of Web application vulnerabilities are general script injections. General script injections occur when untrusted data is used to call functions that manipulate system resources (e.g., in PHP: fopen( ), rename( ), copy( ), unlink( ), etc) or processes (e.g., exec( )). FIG. 3 presents a simplified version of a general script injection vulnerability. Therein, the HTTP request variable "csvfile" is used as an argument to call fopen( ), which allows arbitrary files to be opened. A subsequent code section delivers the opened file to the HTTP client, allowing attackers to download arbitrary files.

The recognition of the significance of these types of attacks is reflected by the recent burst of efforts that aim to improve Web application security via numerous different approaches. In their article "Abstracting Application-Level Web Security", *Proc. 11th Int'l Conf. World Wide Web* (*WWW*2002), Honolulu, Hi., Scott and Sharp proposed the use of a gateway that filters invalid and malicious inputs at the application level. Additionally, most of the leading firewall vendors are also using deep packet inspection technologies in their attempts to filter application-level traffic.

Although application-level firewalls offer immediate assurance of Web application security, they have at least three drawbacks. First, application-level firewalls offer protection at the cost of expensive runtime overhead. Second, careful configuration by very experienced security experts are required for application-level firewalls to function correctly and offer proper protection. Third, application-level firewalls do not identify vulnerabilities, and therefore do not help improve the actual security (or quality) of the Web application. Other techniques provide Web application security assessment frameworks that offer black-box testing (penetration testing) to identify Web application vulnerabilities. However, such testing processes may not identify all vulnerabilities, and they do not provide immediate security for Web applications.

Another possible mechanism for Web application security are software verification (static analysis) techniques which identify vulnerabilities of an application at compile time by analyzing source code. Software verification techniques avoid most of the limitations of application-level firewalls and black-box testing, but typically have their own drawbacks. Specifically, software verification techniques typically (1) cannot offer immediate protection (while e.g., application-level firewalls can), (2) have a high false positive rate, (3) are not scalable and cannot handle large software programs, and (4) cannot offer counterexample traces, which is crucial in helping developers understand and fix the identified vulnerabilities.

Accordingly, it would be desirable to provide methods and systems which enable vulnerabilities in Web applications to be identified while at the same time providing immediate security for those Web applications, and overcoming the other limitations identified above.

SUMMARY

Methods, software tools and systems for analyzing software applications, e.g., Web applications, are described. A software application to be analyzed is transformed into an abstract representation which preserves its information flow properties. The abstract interpretation is evaluated to identify vulnerabilities using, for example, type qualifiers to associate security levels with variables and/or functions in the application being analyzed and typestate checking. Runtime guards are inserted into the application to secure identified vulnerabilities.

According to one exemplary embodiment of the present invention, a method for analyzing a software application includes the steps of generating an abstract interpretation of the software application, wherein the abstract interpretation preserves the software application's information flow properties and verifying a correctness of safety states of the abstract interpretation to identify vulnerabilities in the software application.

According to another exemplary embodiment of the present invention, the lattice model is used to reduce a false positive rate of the verification mechanism, especially for web applications that have apparently used type casts for sanitization purposes. The counterexample traces of identified insecure information flow are rapidly calculated via, but not limited to, testing the unsatisfiability of Boolean formula (s) transformed from an abstract interpretation of the program being analyzed, iteratively. Determining a minimum fixing set according to an exemplary embodiment of the present invention reduces the number of runtime guards which are inserted into the program being analyzed in order to secure the program with the least amount of added overhead.

BRIEF DESCRIPTION OF THE DRAWINGS

The accompanying drawings, which are incorporated in and constitute a part of the specification, illustrate exemplary embodiments of the invention and, together with the description, explain the invention. In the drawings:

FIGS. 1(a)-3 show examples of Web application code associated with potential vulnerabilities;

DETAILED DESCRIPTION

The following description of the exemplary embodiments of the present invention refers to the accompanying drawings. The same reference numbers in different drawings identify the same or similar elements. The following detailed description does not limit the invention. Instead, the scope of the invention is defined by the appended claims.

According to exemplary embodiments of the present invention, Web applications are verified and secured by identifying vulnerabilities and inserting sanitization code to secure the identified vulnerabilities. In PHP (or any other Web programming language), sets of functions affect system integrity. Examples of such sensitive functions in PHP include exec( ), which executes system commands, and echo( ), which generates outputs. However those skilled in the art will appreciate that these are merely examples and that other functions, e.g., those related to system, database, and user-interaction, may also affect system integrity and should be secured as well. To avoid vulnerabilities, when sensitive functions are used in Web applications they should be called with trusted arguments. If sensitive functions are called with untrustworthy data as arguments, then vulnerabilities arise. Exemplary embodiments of the present invention automatically identify statements in Web applications which contain vulnerabilities by establishing a trust policy, also referred to herein as a precondition of a function, for each function in a Web application being analyzed. A functions' trust policy associates a trust level with the function's arguments. Data submitted by a user to the Web application are considered untrustworthy and the propagation of such data is checked against a set of trust policies which are defined for the Web application being analyzed.

Thus, exemplary embodiments of the present invention present software verification techniques which address the afore-mentioned limitations of such techniques as described in the Background section. For example, in order to provide immediate protection to a Web application being analyzed and to reduce the false positive rate of insecurities being detected, exemplary embodiments of the present invention employ a mixture of static analysis and runtime instrumentation techniques. Static analysis techniques try to predict runtime behavior at compile time and, therefore, they are usually imprecise. Runtime instrumentation (runtime guards) are able to collect precise runtime state information and, therefore, have a high detection accuracy, but at the cost of inducing runtime overhead, just like application-level firewalls. By using the static analysis techniques described below, exemplary embodiments of the present invention are able to pinpoint, at compile time, the precise program locations that require runtime instrumentation in order to secure the Web application. Thus, runtime instrumentation is used in exemplary embodiments to increase precision, while also using a compile-time static analysis technique, to pinpoint the exact locations that require runtime instrumentation to reduce the overhead induced by runtime instrumentation. Runtime instrumentation also provides a mechanism to automatically secure the vulnerabilities, which addresses the need for immediate protection of Web applications being analyzed.

In order to address another limitation of software verification techniques, i.e., their inability to scale and handle large software programs, exemplary embodiments of the present invention employ bounded model checking (BMC) as a late-stage verifier. BMC can handle large pieces of software programs and are more scalable than, e.g., binary decision diagram (BDD)-based model checkers, albeit they require a fixed bound to be complete. Thus additional exemplary embodiments of the present invention describe a polynomial-time technique (typestate) to decide the bound for the BMC engine. Since the bound-deciding algorithm (typestate) is polynomial time and BMC is more scalable than BDD-based model checkers, this further increases the scalability of our verification algorithm according to exemplary embodiments of the present invention.

Additionally, in order to address the lack of counterexample traces in software verification techniques, exemplary embodiments of the present invention provide for an algorithm to provide counterexamples based on, e.g., BMC. The counterexamples provided in accordance with these exemplary embodiments not only address the limitation of a lack of information for developers to understand and resolve vulnerabilities, but also further reduces overhead because this information is also used to provide optimal patching of the Web application being analyzed.

These and other features of the present invention will be best understood by a review of some detailed exemplary embodiments. For example, an architecture 40 of a system for verifying and securing Web applications according to a first exemplary embodiment of the present invention is illustrated as FIG. 4. Therein, an input program 42 to be analyzed is input to a code analyzer 45. The code analyzer 45 includes a lexer 46, parser 48 and a program abstractor 52. As described in more detail below, the code analyzer implementation will vary depending upon the particular software language associated with the Web application to be analyzed. Although exemplary embodiments described herein refer to Web applications written in PHP, those skilled in the art will appreciate that the present invention is not limited to analysis of Web applications written in PHP but can also operate on Web applications written in other languages, e.g., Perl, Python, ASP, C, C++, C#, JAVA™, etc.

Figure 4:
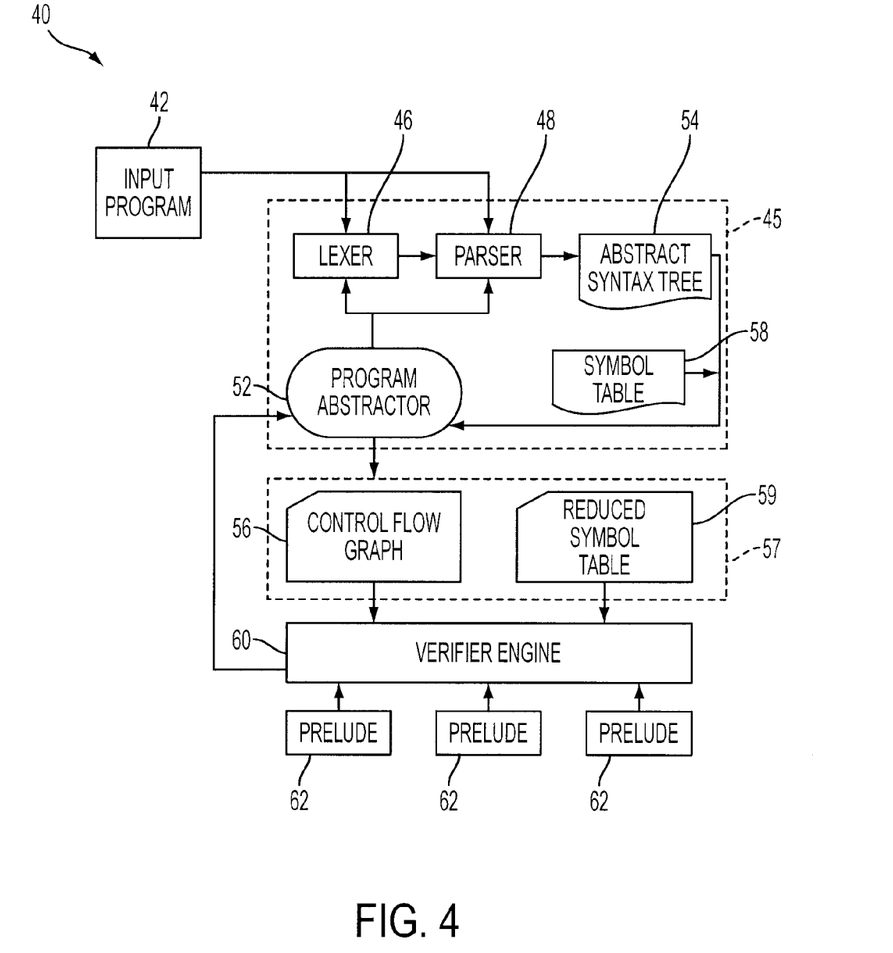
FIG. 4 shows an architecture associated with a software analysis tool according to a first exemplary embodiment of the present invention.

In operation, the verifier engine 60 instructs the program abstractor 52 to generate a full representation of the input program's abstract syntax tree (AST) 54 and symbol table 58. The program abstractor 52 achieves this by using the lexer 46 and parser 48. Given the grammar of the programming language in which the input program is written (which grammar is readily available to those skilled in the art), the lexer 46 and parser 48 can be generated automatically using compiler-compilers such as YACC or JAVACC™. The lexer 46 analyzes characters from the input program and transforms them into tokens (e.g., combinations of text matched by the lexer 46 and corresponding token type codes). The tokens are passed to parser 48 which operates at the language level to recognize grammatical structure associated with the language in which the input program 42 written, to generate the AST 54. By traversing the AST 54 and referencing the symbol table 58, the program abstractor 52 generates an abstract interpretation 57, which consists primarily of a control flow graph (CFG) 56 and a reduced symbol table 59. The CFG 56 is a data structure representing the input program as a sequence of nodes, each of which is associated with a portion of the input program code. The sequence of statements in the original input program is modeled by edges between nodes in the control flow graph 56. The reduced symbol table 59 includes identifiers of various entities manipulated by the input program, e.g., variables, procedures, functions etc. Note that although this exemplary embodiment of the present invention refers to the use of a CFG and reduced symbol table for providing an abstract interpretation of the input program, any other types of data structures which preserve the information flow properties of the input program can be used as alternatives therefor.

Figure 5:
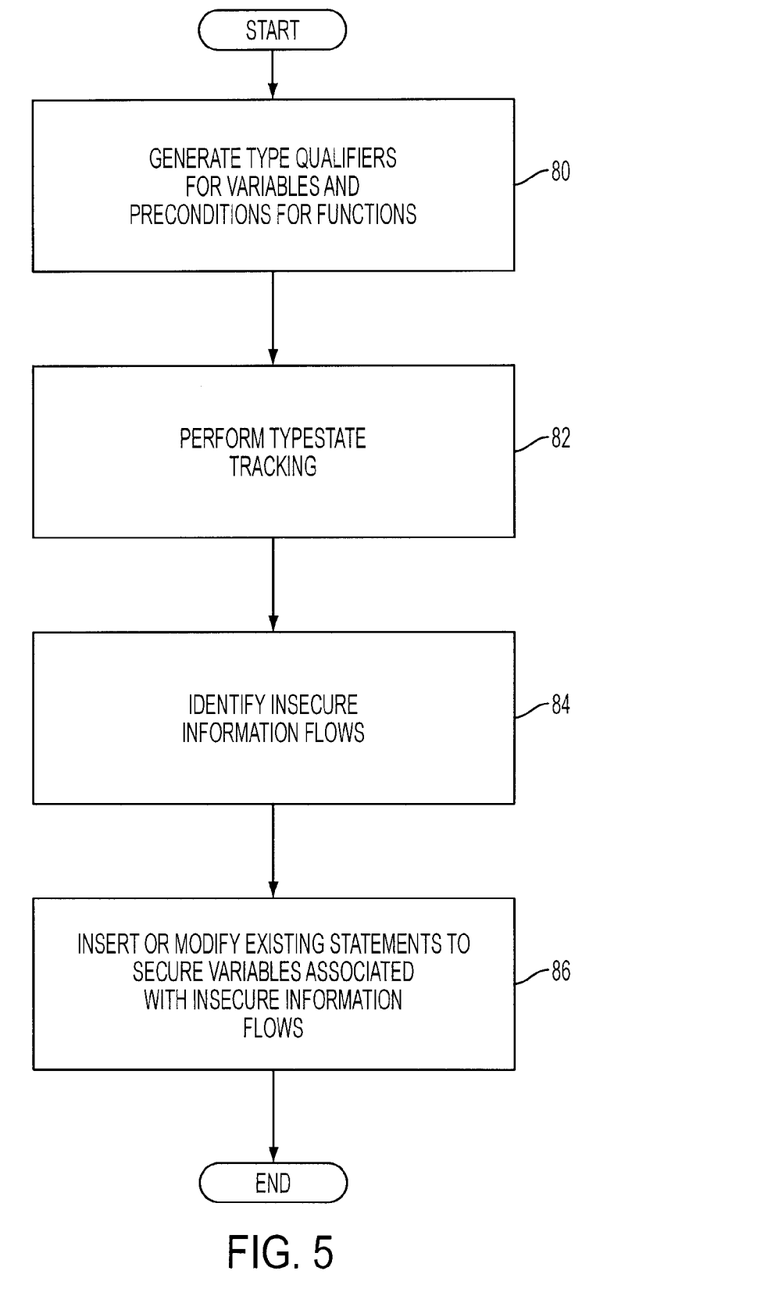
FIG. 5 is a flowchart depicting a method for analyzing a software application according to exemplary embodiments of the present invention.
Figure 12:
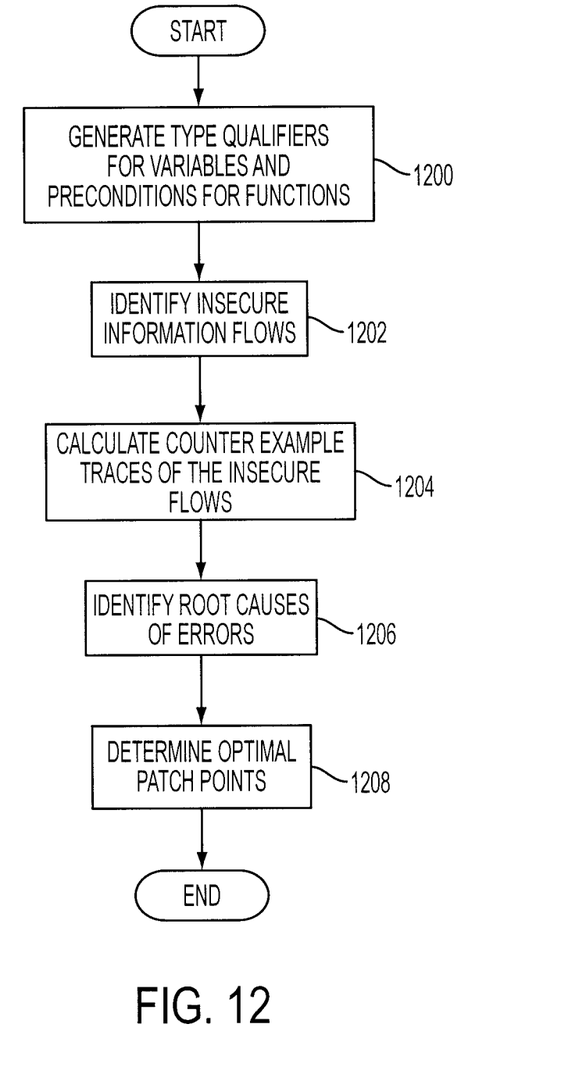
FIG. 12 is a flowchart depicting a method for analyzing a software application according to still another exemplary embodiment of the present invention.

Once the input Web application has been decomposed as described above, the verifier engine 60 can then operate to identify and secure vulnerabilities associated with the input Web application based on, in part, the information provided in prelude files 62, 64 and 66 as will be discussed more specifically below. A general process performed by the verifier engine 60 for identifying and securing vulnerabilities of an input application according to an exemplary embodiment of the present invention is illustrated in the flowchart of FIG. 5. Therein, at step 80, by referencing the prelude files, the verifier engine 60 traverses the abstract interpretation 57 to generate (1) type qualifiers for variables in the program being analyzed and (2) preconditions for functions in the program being analyzed. Then, at step 82, a tracking process is performed using the type qualifiers to determine typestates associated with variables in the program. The typestates and the preconditions are used by the verification engine in step 84 to identify insecure information flows (vulnerabilities). The insecure information flows are then automatically secured by insertion of statements (runtime guards), or modification of existing statement(s), at step 86 to secure variables associated with insecure information flows identified in the previous step. Another method for analyzing a software application in accordance with the present invention is shown in FIG. 12 and described below. Each of the steps illustrated in FIGS. 5 and 12 will now be described in more detail.

According to exemplary embodiments of the present invention, a type qualifier is used at step 80 to associate a particular security class with a particular variable, e.g., those variables that a) will affect the variables used to call sensitive functions and therefore b) are being analyzed by systems and methods according to the present invention to identify vulnerabilities. The type qualifiers characterize data trust levels within an application being analyzed in a manner which permits arithmetic operations to be performed to identify vulnerabilities. Since the security class of a variable is a property of its state, and therefore varies at different points or call sites within a program being analyzed, the type qualifiers and typestating (typetracking) methodology employed should be sufficiently flexible, while also sufficiently precise, to accommodate this characteristic. According to one exemplary embodiment of the present invention, a type system based on a modified version of the type system described in the article "A Lattice Model of Secure Information Flow", authored by D. E. Denning, Communication of the ACM, 19(5), pp. 236-243, 1976, the disclosure of which is incorporated here by reference, can be employed to implement the typestating methodology. The following assumptions were used in employing this type system:

1. Each variable is associated with a security class (trust level).
2. $T=\{\tau_1, \tau_2, \ldots, \tau_n\}$ is a finite set of security classes.
3. T is partially ordered by $\leq$, which is reflexive, transitive, and antisymmetric. For $\tau_1, \tau_2 \in T$.

$\tau_1 = \tau_2$ iff $\tau_1 \leq \tau_2$ and $\tau_2 \leq \tau_1$,
and $\tau_1 < \tau_2$ iff $\tau_1 \leq \tau_2$ and $\tau_1 \neq \tau_2$.

4. $(T, \leq)$ forms a complete lattice with a lower bound $\bot$ such that $\forall \tau \in T, \bot \leq \tau$, and an upper bound $T$ such that $\forall \tau \in T, \tau \leq T$.

These assumptions imply that a greatest lower bound operator and a least upper bound operator exist on the set of security classes T. For subset $Y \subset T$, let $\sqcap Y$ denote T if Y is empty and the greatest lower bound of the types in Y otherwise; let $\sqcup Y$ denote $\bot$ if Y is empty and the least upper bound of the types in Y otherwise, where T refers to an upper-bound operator and $\bot$ refers to a lower-bound operator. The upper- and lower-bound operators are used to determine types resulting from expressions in the application being analyzed.

In the lattice model described in the above-identified article to Denning, security classes are extensions to be checked separately from the original type system. For example, according to Denning's model, a variable's type may be "integer" or "string," while its security class may be "trustworthy" or "tainted." Thus, using Denning's model, the security class of a variable is independent from the original type of the variable. By way of contrast, according to exemplary embodiments of the present invention, a variable's security class is dependent upon its original type. This feature of the present invention greatly reduces the false positive rate of the verification mechanism, since many developers of Web applications have apparently used type casts for sanitization purposes as will be described below with respect to FIGS. 6(a) and 6(b).

Based on this framework, exemplary embodiments of the present invention employ a type environment which enables the security classes of variables to be changed and flow-sensitive properties to be considered. This latter characteristic of preserving the flow-sensitive properties of the program being analyzed enables each branch that can be executed to be considered as part of the security analysis. A type environment $\Gamma: X \mapsto T$ is a mapping function that maps variables to security classes at a particular program point. For each variable $x \in \text{dom}(\Gamma)$, the uniquely mapped type $\tau$ of x in $\Gamma$ is denoted herein as $\Gamma(x)$. To approximate runtime type environment at compile-time, a variable's security class can be viewed as a static most restrictive class of the variable at each point in the program text. That is, if a variable x is mapped to $\Gamma(x)$ at a particular program point, then its corresponding execution time data object will have a class that is at most as restrictive as $\Gamma(x)$, regardless of which paths were taken to reach that point in the program. Formally, for a set of type environments G, $\Gamma = \oplus G$ is denoted as the most restrictive type environment, such that $\Gamma(x) = \sqcap_{\Gamma' \in G} \Gamma'(x)$. When verifying a program at a particular program point r, $\Gamma = \oplus G_r$, where $G_r$ represents the set of all possible type environments, each corresponding to a unique execution-time path that could have been taken to reach r.

Figure 6A:
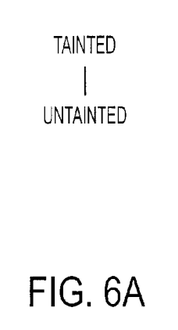
FIGS. 6(a) and 6(b) illustrate various security lattices which can be employed according to exemplary embodiments of the present invention.

To illustrate this concept, consider the tainted-untainted (T-U) lattice of security classes shown in FIG. 6(a) in conjunction with the two exemplary code snippets provided below.

Example A

1: if (C) x=t1/else x=u1
2: exec(x);

Example B

1: if (c) x=u1; else x=u2;
2: exec(x);

Therein, the T-U lattice has only two elements—untainted as its lower bound and tainted as its upper bound. Assume that variable t1 in the foregoing code snippets is tainted and that variables u1 and u2 are untainted. Since the sensitive PHP function exec( ) requires an untainted argument, for line 2 of FIGS. 10 and 11 to typecheck the static most restrictive class of x shall be identified. In other words, the security class $\Gamma(x)$ that is the most restrictive of all possible runtime classes of x at line 2, regardless of the execution path taken to get there, should be determined. In line 2 of Example A, since x can be either tainted or untainted, $\Gamma(x)$=tainted $\sqcap$ untainted and line 2 therefore triggers a violation. On the other hand, line 2 of Example B typechecks.

As mentioned above, a type-aware lattice may be used according to exemplary embodiments of the present invention to characterize the set of security class values to reduce the potential for false positive identification of vulnerabilities. If, for example, type casts are used for sanitization purposes, the lattice of FIG. 6(a) may generate false positives. Consider code example C below.

Example C

1: $i=(int) $_POST['index'];
2: $s=(string) $i;
3: echo "<hidden name=mid value='$s'"

Figure 6B:
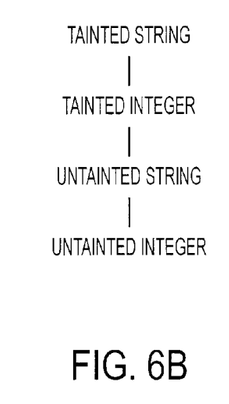

Therein, since $_POST ['index'] is tainted, $i is tainted after line 1, and $s is tainted after line 2. Line 3 in code example C therefore does not typecheck, since the sensitive PHP function echo ( ) requires untainted string values for its argument. However, since echo ( ) can accept tainted integers without compromising system integrity (e.g., without being vulnerable to XSS attacks), flagging this exemplary code snippet as a vulnerability can be considered a false positive and may result in unnecessary overhead if runtime guards are inserted into the program as a result. By way of contrast, using a type-aware lattice according to the present invention, e.g., as shown in FIG. 6(b), $s is assigned the security class "tainted integer" after line 2, and since echo( ) can accept arguments lower than class "tainted string," line 3 is considered secure, thereby avoiding the false positive.

Since all HTTP variables are stored as strings (regardless of their actual type), using a single cast to sanitize certain variables may be a common practice in Web applications to be analyzed using techniques in accordance with the present invention. However, the false positive example described above indicates that it may be beneficial to provide security classes that are type-aware. Thus an alternative to the lattice of FIG. 6(a) is illustrated in FIG. 6(b) to provide a lattice of type-aware security classes according to an exemplary embodiment of the present invention.

Figure 7:
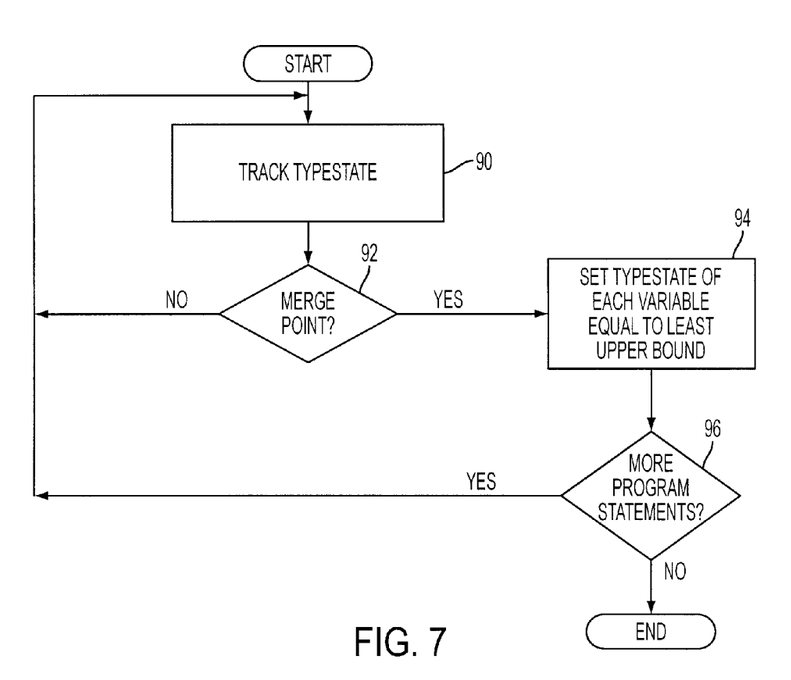
FIG. 7 is a flowchart illustrating a typestate tracking according to an exemplary embodiment of the present invention.

To preserve the static most restrictive class, exemplary embodiments of the present invention provide rules for resolving the typestate of variable names. According to one exemplary embodiment of the present invention, the algorithm proposed by Strom and Yemini in their article "Typestate: A Programming Language Concept for Enhancing Software Reliability", IEEE Transactions on Software Engineering, 12(a): pp. 157-171, January 1986, the disclosure of which is incorporated here by reference, can be used for this purpose, with certain modifications. Thus, step 82 of the method of FIG. 5 can be accomplished by performing the sub-steps illustrated in the flowchart of FIG. 7. Therein, flow-sensitive tracking of the typestate is performed as described in the above-incorporated by reference article to Strom et al. at step 90. Then at execution path merge points in the program being analyzed (e.g., the beginning of a loop or the end of a conditional statement, step 92), the typestate of each variable is set equal to the least upper bound of the typestates of that same variable on all merging paths at step 94. Using, in this example, the lattice of FIG. 6(b), the least upper bound operator on a set selects the most restrictive class from the set. Note that while the algorithm described in the above-incorporated by reference Strom et al. article used typestate to represent a static invariant variable property, and therefore applying the greatest lower bound operator, this exemplary embodiment of the present invention employs the typestating algorithm to represent the static most restrictive class and, accordingly, apply the least upper bound operator instead.

Returning to FIG. 5, once the typestating step 82 is completed, then the verifier engine 60 can proceed to identify vulnerabilities in the program being analyzed by identifying insecure information flows using the typestate for each variable associated with a sensitive function as well as the preconditions associated therewith. According to one exemplary embodiment of the present invention, this can be accomplished as follows. At call sites to sensitive functions in the program being analyzed, the function SATISFY ($\Gamma$, f, x) checks whether $\Gamma(x)$ satisfies a particular function f's precondition. When verifying, type judgments are derived according to command sequences and n error when SATISFY ($\Gamma$, f, x) fails. That is, given a program P and its initial type environment $\Gamma_0$ (usually mapping all variables to untainted), then the validity of P depends on whether we can derive the judgment $\Gamma_0 \vdash P \to \Gamma$ by following the judgment rules below.

1. Updating Rules:

(Tainting)

$$\frac{f \in T}{\Gamma \vdash f(x) \to \Gamma[x \mapsto \text{tainted}]}$$

(Assignment)

$$\Gamma \vdash x := e \to \Gamma[x \mapsto \Gamma(e)]$$

(Sanitation)

$$\frac{f \in S}{\Gamma \vdash f(x) \to \Gamma[x \mapsto \text{untainted}]}$$

(Restriction)

$$\frac{\Gamma \vdash C_1 \to \Gamma_1 \quad \Gamma \vdash C_2 \to \Gamma_2}{\Gamma \vdash \text{if } e \text{ then } C_1 \text{ else } C_2 \to \Gamma_1 \oplus \Gamma_2}$$

2. Checking Rule:

(Precondition)

$$\frac{f \in C, \text{SATISFY}(\Gamma, f, x)}{\Gamma \vdash f(x) \to \Gamma}$$

3. Concatenation Rule:

(Concatenation)

$$\frac{\Gamma \vdash C \to \Gamma'' \quad \Gamma'' \vdash C' \to \Gamma'}{\Gamma \vdash C; C' \to \Gamma'}$$

4. Mapping Rules:

$\Gamma(n) = \text{untainted}$ $\Gamma(e \sim e') = \Gamma(e) \sqcup \Gamma(e')$ Once the insecure information flows are identified by the verifier engine 60, then the process moves to step 86 of FIG. 5 wherein statements are inserted (and/or existing statements are modified) to secure variables associated with the insecure information flows. The inserted statements can, for example, treat the variables that are associated with the identified vulnerabilities with sanitization routines which are stored in one of the prelude files 62. Each statement insertion can, for example, be made right after a statement that caused a variable to become tainted.

A software analysis tool operating in accordance with the foregoing exemplary embodiment was tested against a sample of 230 open source programs drawn from SourceForge.net. As part of this test, the software analysis tool scanned 11,848 files having 1,140,091 program statements. During one test run, wherein the lattice of FIG. 6(a) was employed, of the 11,848 files scanned, 515 were identified by the software analysis tool as having vulnerabilities. Subsequent manual verification of the files identified by the software analysis tool indicated that only 361 files were actually vulnerable—indicating that the software analysis tool generated a false positive rate of approximately 29.9 percent during this test run. By using the type-aware lattice of FIG. 6(b) instead of the lattice of FIG. 6(a), the number of vulnerable files identified by the software analysis tool was reduced to 494 to reduce the false positive rate to approximately 26.9 percent. Of the total 1,140,091 statements tested, 57,404 were associated with making sensitive function calls using tainted variables as arguments. The software analysis tool identified 863 of these function calls as insecure and subsequent manual analysis of the tested function calls indicated that 607 were actually vulnerable. Adding sanitization to all 57,404 statements would have induced significant overhead. By automatically identifying only 863 statements as vulnerable (albeit with 256 false positives), the overhead associated with securing these programs was significantly reduced. More details regarding this testing, and other aspects of this exemplary embodiment of the present invention, can be found in Applicants' article to Huang et al., "Securing Web Application Code by Static Analysis and Runtime Protection", presented at the WWW2004 conference, May 17-22, 2004, New York, N.Y., the disclosure of which is incorporated here by reference.

In the previous exemplary embodiment, maintaining the most restrictive environments at merge points of execution paths of the programs being analyzed keeps the search space for vulnerabilities relatively small, but does not provide for counterexample traces. Thus runtime guards are inserted at potentially vulnerable function call sites by processes according to the previous exemplary embodiment to sanitize tainted variables before they are used as arguments for calling sensitive functions. However, following initial induction, a single piece of tainted data becomes capable of triggering a snowball process of data propagation and tainting, with the number of tainted variables growing exponentially as the program executes. Thus, according to another exemplary embodiment of the present invention described below, processes, software tools and algorithms provide counterexample traces to identify where the tainting process begins and to enable sanitizing of the tainted data before it propagates.

Figure 8:
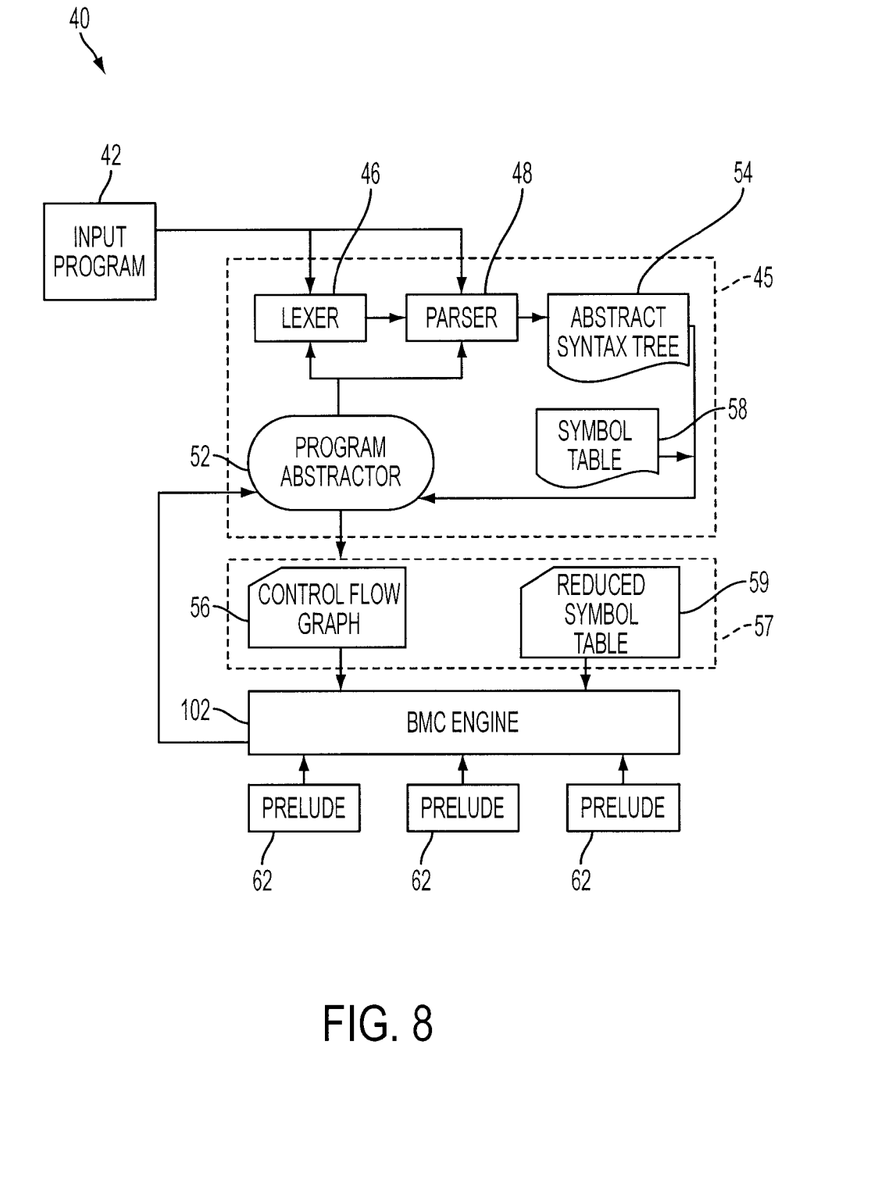
FIG. 8 shows an architecture associated with a software analysis tool according to a second exemplary embodiment of the present invention.

This exemplary embodiment of the present invention has an architecture as illustrated in FIG. 8. Therein, elements which are substantially similar to elements previously described with respect to FIG. 4 retain the same reference numerals and are not further described here. Generally speaking, according to this exemplary embodiment, the program abstractor 52 generates an abstract interpretation 57 which is operated on by a bounded model checking (BMC) engine 102 to identify and secure vulnerabilities. The BMC engine 102 includes a number of different processing functions, illustrated in FIG. 9, including a renamer function 104, a constraint generator 106, a SAT solver 108, a counterexample analyzer 110 and an instrumentor 112. This verification process, and operation of these functions in the BMC engine 102, according to this exemplary embodiment will now be described in more detail below.

To generate the abstract interpretation 57, given a program p to be analyzed, a filter generates F(p), which includes command sequences constructed according to the following syntax rules:
(commands)
c::=x:=e|f$_i$(X)|f$_o$(X)|stop|if e then c$_1$ else c$_2$|while e do c|c$_1$;c$_2$
(expressions)
e::=x|n|e$_1$~e$_2$,
where x is a variable, n is a constant, ~ stands for binary operations such as +, and
X ⊂ dom(p) is a variable set.

By preserving only assignments, function calls and conditional structures in the program being analyzed, filter F(p) unfolds function calls and discards all program constructs that are not associated with information flow. During execution, data is retrieved from external sources (e.g., reading files or retrieving environment variables). Functions that permit the flow of external data into a program are identified as untrusted input channels (UIC), denoted as fi(X). An example in PHP is $HTTP_GET_VARS which retrieves data from HTTP requests sent by Web clients. In software analysis tools and methods according to this exemplary embodiment of the present invention, UICs are assigned predefined postconditions consisting of command sets that match the designated safety levels of the retrieved data. At the same time, program execution also entails calling functions that manipulate system resources or affect system integrity—in PHP, for instance, exec( ) executes system commands and echo( ) generates output, as well as other functions related to system, database, and user-interaction. These functions—identified as sensitive functions or sensitive output channels (SOC) and denoted as fo(X)—should be called with trusted arguments. Each one is assigned a predefined precondition that states the required argument safety levels.

When verifying conditional structures within a program being analyzed, the focus is on making sure each branched path behaves correctly rather than how a particular condition e evaluates. In path-sensitive terminology, this means that these conditions are treated as nondeterministic conditions. Furthermore, since information flow is being considered, rather than control flow, loop structures can be deconstructed into selection structures.

Figure 10:
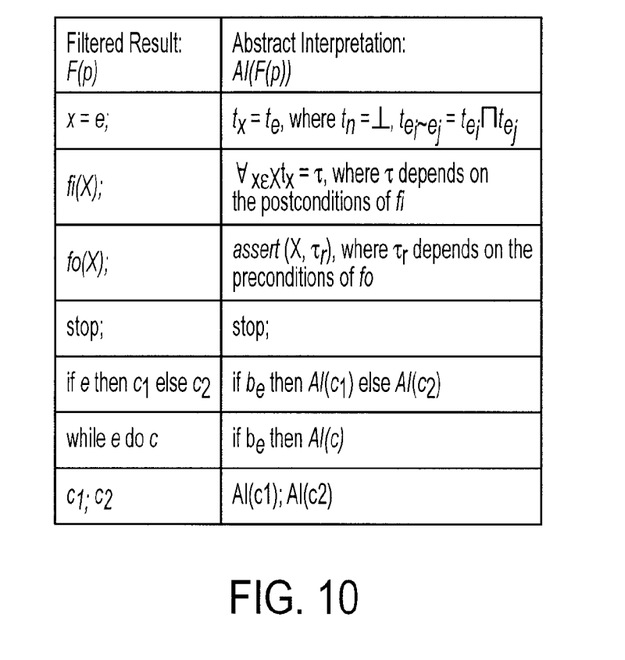
FIG. 10 show examples for constructing an abstract interpretation according to an exemplary embodiment of the present invention.

Consequently, given a safety type lattice T and sets of pre- and postconditions, F(p) is translated into an abstract interpretation that includes if instructions, type assignments and assertions. An example of an intuitive interpretation procedure AI(F(p)) is illustrated in FIG. 10. Therein, an assignment from expression e to variable x is translated into a type assignment that conveys e's safety type to x. Function preconditions are expressed using assertions (assert (X, $\tau_r$)) that specify safety requirements ($\forall_{x \in X}$, $t_x < \tau_r$, $\tau_r \in$ dom(T)), meaning that the types of all variable in X must be lower (safer) than $\tau_r$. Postconditions are expressed using type assignment sets (of the form $\forall_{x \in X}$, $t_x = \tau$, $\tau_\epsilon$ dom(T)) that describe the safety level of each piece of retrieved data. As in the previous exemplary embodiment, pre- and postcondition definitions can be stored in two prelude files 62 that are loaded during startup.

Figure 9:
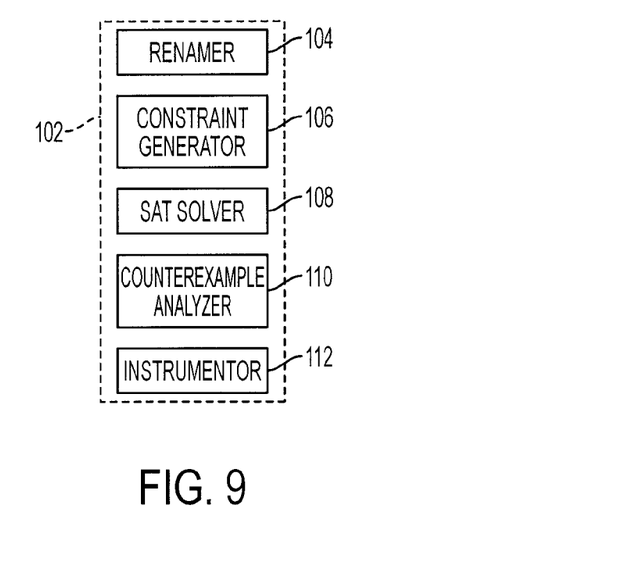
FIG. 9 illustrates a boundary model checking engine from the architecture of FIG. 8 in more detail according to an exemplary embodiment of the present invention.

Using the abstract interpretation (AI) framework described above, the verification of a given PHP program p by the BMC engine 102 involves checking whether AI(F(p)) is consistent with its assertions. The AI(F(p)) will have certain characteristics according to this exemplary embodiment of the present invention, which characteristics can be used to select a technique for performing the verification. First, AI(F(p)) is loop-free and its flowchart forms a directed acyclic graph (DAG), implying a fixed program diameter. Second, AI(F(p)) represents a single sequential process with large numbers of: a) variables and b) branches following simple assignments. Based on these characteristics, this exemplary embodiment employs Bounded Model Checking (BMC) to perform verification. In BMC, a system's transition relations are unfolded with bounded steps and coupled with initial and risk conditions to form a CNF formula, which is then solved using the SAT solver 108.

The first task associated with performing the BMC process is to keep track of program behaviors. One way to accomplish this is to add an auxiliary variable 1 to record program lines (statements). Given a program p, let X=1∪{t$_x$|X∈dom(AI(F(p)))} denote state variables, then construct a control-flow graph CFG(X,p). The transition relations of CFG(X,p) are encoded as a CNF formula, T(s,s'), where s and s' denote the current and the subsequent program states (the evaluation of X), respectively. By rolling T(s$^i$, s$^{i+1}$) up for a bounded k number of steps (the length of the longest path in CFG(X,p)), the entire formula is represented as: B(X,k)=I(s$^0$)∧ T(s$^0$,s$^1$)∧ ... ∧ T(s$^{k-1}$,s$^k$) ∧ R(s$^i$, ..., s$^k$), where I(s$^0$) is the initial condition and R(s$^i$, ..., s$^k$) specifies the risk conditions (assertion negations) within the ith and kth states.

Another method for tracking program behaviors is to use a variable renaming technique, such as that described in the article by Clarke et al. entitled "Behavioral Consistency of C and Verilog Programs using Bounded Model Checking", Proc. 40$^{th}$ Design Automation Conference, Session 23.3, Anaheim, Calif. 2003, the disclosure of which is incorporated here by reference. Using this technique in renamer function 104, AI variables are renamed such that each renamed variable is assigned only once. For example, assume that variable v is referred to at program location i in an AI. Let α denote the number of assignments made to variable v prior to i, then the variable v at location i is renamed to $v_\alpha$. After this renaming procedure p, each assignment becomes unique, which allows for information flow tracking without the need for auxiliary location variables.

After variable renaming, the BMC engine 102 performs constraint generation using function 106 to map the AI commands into a format which is compatible with BMC processing. Given a command c, the constraint generated by procedure C(c,g) is shown in Table 1, below, wherein g denotes the guard and is initially true.

TABLE 1

| AI Command | Constraint |
| --- | --- |
| stop; or empty | C (c, g) := true |
| t$_x$=t$_e$ | C (c, g) := T$^i_x$ = g? p(t$_e$):t$^{i-1}_x$ |
| assert (Π (t$_x$ | x ∈ X)<T$_R$) | C(c,g):= g⇒p ( ∩$_{x \in X}$ t$_x$< T$_R$) |
| if b$_e$ then c$_1$ else c$_2$ | C(c,g):=C(c$_1$,g∧ b$_e$) ∧ C(c$_2$, g∧¬b$_e$) |
| c$_1$; c$_2$ | C(c,g):=C(c$_1$,g)∧ C(c$_2$,g) |

Figure 11:
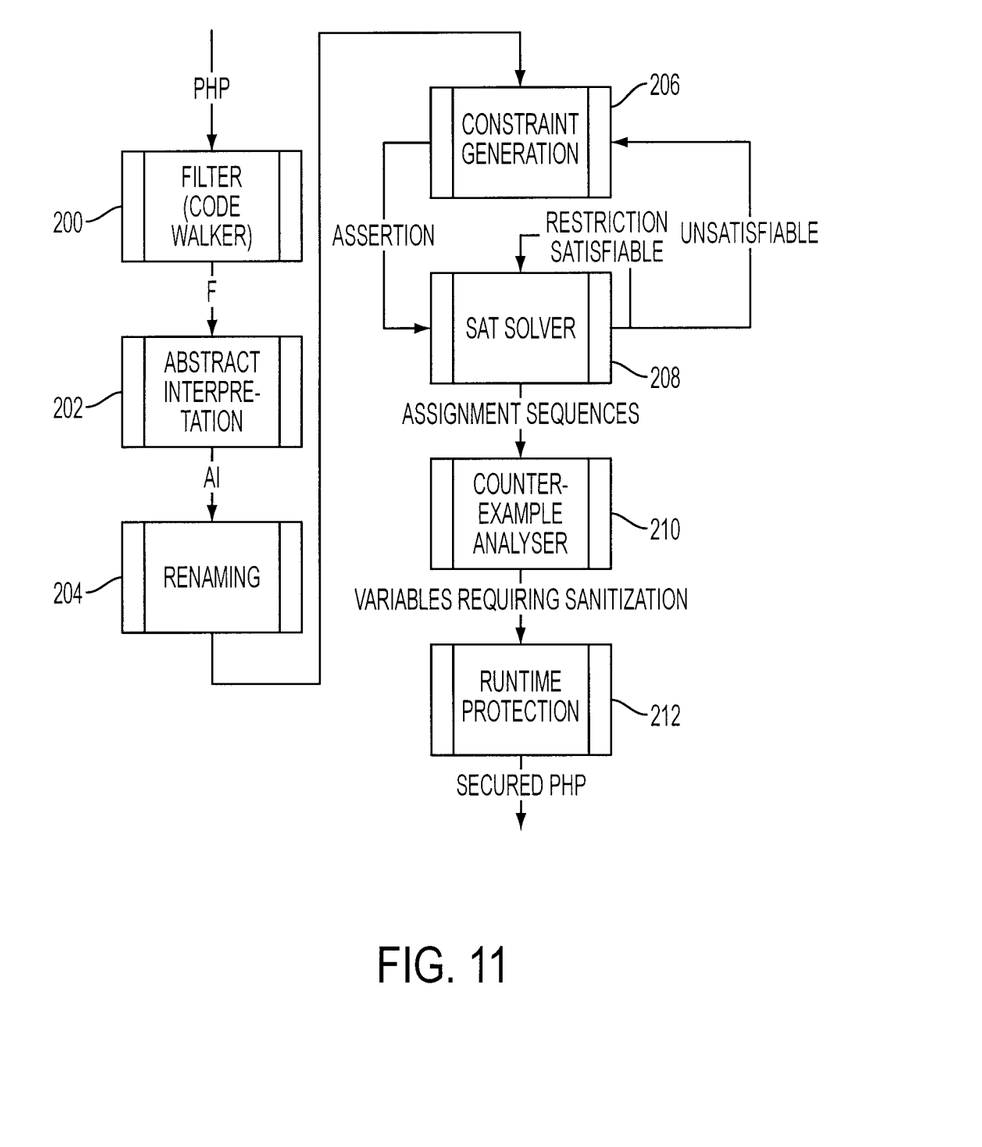
FIG. 11 is a flowchart depicting a method for analyzing a software application according to another exemplary embodiment of the present invention.

However, instead of checking all assertions at the same time, this exemplary embodiment of the present invention checks one assertion at a time and generates all counterexamples for that assertion. This looping feature of the BMC engine 102 is seen in the flowchart of FIG. 11. Therein, after steps 200-204 described above, for each assertion generated by the constraint generator 106 at step 206, a formula B is first generated. When generating a formula B$_i$ for an assertion assert$_i$, that assertion and all of its preceding commands are viewed as a concatenation c;assert$_i$. The corresponding formula B$_i$, is then constructed with the negation of assert$_i$. B$_i$:=C (c, g)∧¬ C (assert$_i$, g). Examples are given in Table 2, below.

TABLE 2

| PHP source code | Filtered Result | Abstract Interpretation |
|---|---|---|
| ...<br>if (Nick) {<br>  $tmp=$_GET["nick"];<br>  echo<br>  (htmlspecialchars<br>    ($tmp)<br>  );<br>} else {<br>  $tmp="You are the".<br>  $GuestCount." guest";<br>  echo($tmp);<br>}<br>... | ...<br>if (Nick) {<br>  f'i(nick);<br>  tmp=nick;<br>  f'$_i$(tmp);<br>  f$_o$(tmp);<br>} else {<br>  tmp=GuestCount;<br>  fo(tmp);<br>}<br>... | ...<br>if $b_{Nick}$ then<br>  $t_{nick}=T$;<br>  $t_{tmp}=t_{nick}$;<br>  $t_{tmp}=U$;<br>  assert ($t_{tmp} < T$);<br>else<br>  $t_{tmp}=t_{GuestCount}$;<br>  assert ($t_{tmp} < T$);<br>... |

| Renaming | Constraints for each assertion |
|---|---|
| ...<br>if $b_{Nick}$ then<br>  $t^i_{nick}=T$;<br>  $t^j_{tmp}=t^i_{nick}$;<br>  $t^{j+1}_{tmp}=U$;<br>  assert$_k$($t^{j+1}_{tmp} < T$);<br>else<br>  $t^{j+2}_{tmp}=t^k_{GuestCount}$;<br>  assert$_{k+1}$ ($t^{j+2}_{tmp} < T$);<br>... | $B_k = (t^i_{nick}=^b_{Nick}?T:t^{j-1}_{nick}) \wedge$<br>  $(t^j_{tmp}=^b_{Nick}?t^i_{nick}:t^{j-1}_{tmp}) \wedge$<br>  $(t^{j+1}_{tmp}=^b_{Nick}?U:t^j_{tmp}) \wedge$<br>  $\neg(^b_{Nick} \Rightarrow t^{j+1}_{tmp} < T)$<br>$B_{k+1} = (t^i_{nick}=^b_{Nick}?T,i-1_{nick}) \wedge$<br>  $(t^j_{tmp}=^b_{Nick}?t^i_{nick}:t^{j-1}_{tmp}) \wedge$<br>  $(t^{j+1}_{tmp}=^b_{Nick}?U:t^j_{tmp}) \wedge$<br>  $(^b_{Nick} \Rightarrow t^{j+1}_{tmp} < T) \wedge$<br>  $(t^{j+2}_{tmp}=^b_{Nick}?t^k_{GuestCount}:t^{j+1}_{tmp}) \wedge$<br>  $\neg(\neg^b_{Nick} \Rightarrow t^{j+2}_{tmp} < T)$ |

CNF($B_i$) transforms $B_i$ into a CNF formula, which can then be solved using SAT solver 108, e.g., the efficient SAT solver zChaff which is described in the article by Moskewicz et al., "Chaff:Engineering an Efficient SAT Solver", Proc. 38th Design Automation Conference", Session 33.1, New Orleans, La., 2001, the disclosure of which is incorporated herein by reference.

If B is satisfiable at step 208, a counterexample is obtained and formula B is then made more restrictive by negating out the counterexample. More specifically, if CNF($B_i$) is satisfiable, the SAT solver 108 proposes a truth assignment $\alpha_i$ that violates assert$_i$. Let $B_N$ denote the set of all nondeterministic Boolean variables in the AI. According to $B_N$'s values in $\alpha_i$, the AI can be traced and a sequence of single assignments can be generated, which represents one counterexample trace. In order to collect all possible counterexamples, $B_i$ is iteratively made more restrictive until it becomes unsatisfiable. In other words, each time a truth assignment $\alpha_i^j$ is proposed at the jth iteration, a negation clause $N_i^j$ of $B_N$ is generated. Thus the more restrictive formula $B_i^j$ at the j+1th iteration is defined as $B_i^j = B_i \wedge N_i^1 \wedge \ldots \wedge N_i^j$. Once the formula $B_i$ becomes unsatisfiable, the flow returns to the constraint generation step 206 to generate C(c,g):=C($c_i$,g) $\wedge$ C(assert$_i$,g) until the next assertion is encountered. Since the AI version of the program being analyzed is loop-free, each assertion will be checked once.

For any instance of unsafe code reported by the BMC engine 102, this exemplary embodiment of the present invention inserts guards that perform run-time inspections as part of an automated patching process—specifically, by inserting routines that sanitize untrusted input before they are used by SOCs. However, several combinations of patching locations may fix the same section of insecure code. Consider the following code example.

```
1: $sid = $_GET['sid']; if (!$sid) {$sid = $_POST['sid'];}
2: $iq = "SELECT * FROM groups WHERE sid=$sid";DoSQL($iq);
3: $i2q = "SELECT * FROM ans WHERE sid=$sid; DoSQL($i2q);
4: $fnquery = "SELECT * FROM questions, surveys WHERE
   questions.sid=surveys.sid AND questions. sid='$sid'"
   DoSQL($fnquery);
```

In this example, the tainted variable $sid taints $iquery, $i2query, and $fnquery, causing lines 2, 3, and 4 to become vulnerable. A straightforward fixing set for this vulnerability would be {$iquery, $i2query, $fnquery, as would be adopted according to the previous exemplary embodiment of the present invention. However, the optimal fixing set is {$sid}, and so sanitizing $sid is by itself an effective fix sufficient to secure the code with the introduction of less overhead. Accordingly, this exemplary embodiment of the present invention takes advantage of BMC-produced counterexamples to identify an optimal patching combination with a minimum number of insertions at steps 210 and 212 in FIG. 11. An exemplary technique for achieving this objective is described below.

For an error trace r, the set of variables that directly caused assertion violations (i.e., variables that appeared in assertion commands and caused violations) are referred to as violating variables, and a variable set that yields an effective fix when sanitized as a fixing set. Given an error trace set R, the goal is to find a minimal fixing set $V_R$ such that for every trace r∈R, Fix($V_R$) serves as an effective fix of r. For an error trace r∈R, let $V_r$ denote the violating variables of r. The straightforward method of finding a fixing set for R is $$V_R^n = \bigcup_{\forall r \in R} V_r.$$

This straightforward technique is encompassed by one exemplary embodiment of the present invention since fixing all violating variables in R removes all error traces (for all r∈R, Fix($V''_R$) is an effective fix). However in many cases, one example of which was described above, $V''_R$ is not the minimum set.

To establish a framework for determining the minimum set, for each violating variable $v_\alpha \in V_r$, a replacement set $s_{v_\alpha}$ is built by tracing back from the violation point along the error trace r while recursively adding variables that serve as unique r-values of single assignments. That is:

$$s_{v_\alpha} = \begin{cases} \{v_\alpha\} \cup S_{v_\beta}, & \text{if the single assignment is of the form } v_\alpha = v_\beta \\ \{v_\alpha\}, & \text{otherwise.} \end{cases}$$

Note that if $v_\alpha$ is tainted, then $s_{v_\alpha}$ presents a tainted flow path along which subsequent assignments cause $v_\alpha$ to become tainted. While tracing back along the error trace r, $s_{v_\alpha}$ is expanded with variables that can be sanitized instead of $v_\alpha$, yet achieve the same effect as sanitizing $v_\alpha$.

Then, to identify the root errors, an error trace set R's minimum fixing set is calculated. First, for each r∈R, the violating variable set $V_r$ is identified and y the straightforward approach is applied to derive $V''_R$, where $$V_R^n = \bigcup_{\forall r \in R} V_r.$$

Second, for each $v_\alpha \in V^m{}_R$, its replacement set $s_{v\alpha}$ is calculated. Finally, the minimum effective fixing set $V^m{}_R$ can be obtained by solving min $|V^m{}_R|$ such that $\forall_{v\alpha} \in_{V}{}^n{}_R s_{v\alpha} \cap V^m{}_R \neq \emptyset$.

This minimum fixing set can be solved for in a variety of ways. One technique is to set up a MINIMUM-INTERSECTING-SET (MIS) problem. For example, given a variable set V and a collection of subsets of V, $S=\{S_1, \ldots, S_n\}$, a minimum set $M \subset V$ is found, such that for $1 \leq i \leq n$, $S_i \cap M \neq \emptyset$. This MIS problem can be reduced to the SET-COVER problem where all sets have an equal cost. Therefore, in this exemplary embodiment of the present invention, a greedy heuristic algorithm, such as that described by V. Chvatal in "A Greedy Heuristic for the Set Covering Problem", Mathematics of Operations Research, 4:33-235, 1979, the disclosure of which is incorporated here by reference, can be employed by counterexample analyzer 110, which gives a 1+ln(|S|) approximation ratio in polynomial time. The reduction procedure is described as follows. Given a universe U of n elements, a collection of subsets of U, $S_v=\{S_{v1}, \ldots, S_{vk}\}$, and a cost function c: $S_v \rightarrow Q^+$, the SET-COVER problem asks to find a minimum-cost subcollection of $S_v$ whose set union is U. The reduction takes each $S_i$ as an element of U. Let $S_v=\{S_v|v_i \in V\}$, where $S_{vi}=\{S_j|v_i \in S_j, S_j \in U\}$, and $c(S_{vi})$ be a constant. The MIS problem can be solved by first solving the SET-COVER problem and then replacing each selected $S_{vi}$ with $v_i$ to arrive at a minimum fixing set for inserting the runtime guards at step 212 and secure the vulnerabilities identified by the BMC engine 102. More details regarding these and other features of this exemplary embodiment of the present invention can be found in the article to Applicants entitled "Verifying Web Applications Using Bounded Model Checking", IEEE Proceedings of the 2004 International Conference on Dependable Systems and Networks (DSN'04), September 2004, the disclosure of which is incorporated here by reference.

A subset of 38 of the 230 applications which were tested using a software analysis tool in accordance with the first exemplary embodiment of the present invention were also tested using a software analysis tool in accordance with the second exemplary embodiment of the present invention. For this subset of applications, the software analysis tool in accordance with the first exemplary embodiment of the present invention reported 980 vulnerable statements, whereas the software tool operating in accordance with the second exemplary embodiment (BMC engine) reported a total of 578 error introductions. This implies that the 980 vulnerabilities were associated with the propagation of 578 errors for the tested subset. Accordingly, using the second exemplary embodiment of the present invention to identify optimal placement of the runtime guards to secure vulnerabilities resulted in an additional 41 percent reduction in overhead as compared to the first exemplary embodiment of the present invention.

Two exemplary benefits of counterexample traces according to some exemplary embodiments of the present invention are a) they allow for more informative error reports, and b) they can be used to identify multiple errors (symptoms) with the same root cause. Such information not only contributes to greater report accuracy, but also sharply reduces the number of inserted runtime guards.

FIG. 12 is a flowchart illustrating a method for analyzing a software application, e.g., a Web application according to an exemplary embodiment of the present invention. Therein, at step 1200, type qualifiers and preconditions are generated for variables and functions, respectively. Next, at step 1202, insecure information flows are identified. Counterexample traces are calculated for the identified insecure flows at step 1204. Using the counterexample traces, root causes of errors are determined at step 1206, from which optimal patching points in the program can be determined at step 1208.

Numerous variations and permutations of the foregoing exemplary embodiments are also contemplated. For example, although the late stage verifier in the exemplary embodiment of FIG. 8 is described above as a BMC engine 102, it will be appreciated that other techniques can be employed in addition to, or as an alternative to, boundary model checking for determining whether the abstract interpretation of a program being analyzed is consistent with its assertions. More generally, such techniques are referred to herein as "formal method techniques" which include, for example, boundary model checking, checking using binary decision diagrams (BDDs), symbolic model checking, theorem proving, etc. In fact, according to other exemplary embodiments of the present invention, the specific checking algorithm used as a late stage verifier can be selected from among a plurality of different formal method techniques based on predetermined characteristics of the abstract interpretation of the program being analyzed.

Thus, according to exemplary embodiments of the present invention, the lattice model is used in analytical programs and methods to reduce a false positive rate of the verification mechanism, especially for web applications that have apparently used type casts for sanitization purposes. The counterexample traces of identified insecure information flow are rapidly calculated via, but not limited to, testing the unsatisfiability of Boolean formula (s) transformed from an abstract interpretation of the program being analyzed, iteratively. Determining a minimum fixing set according to an exemplary embodiment of the present invention reduces the number of runtime guards which are inserted into the program being analyzed in order to secure the program with the least amount of added overhead.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

The foregoing description of exemplary embodiments of the present invention provides illustration and description, but it is not intended to be exhaustive or to limit the invention to the precise form disclosed. Modifications and variations are possible in light of the above teachings or may be acquired from practice of the invention. The following claims and their equivalents define the scope of the invention.

The invention claimed is:

1. A method for statically analyzing a software application performed by at least one processor comprising the steps of:
  statically generating an abstract interpretation of said software application which approximates runtime states of said software application, wherein said abstract interpretation preserves said software application's information flow properties;
  verifying a correctness of safety states of the abstract interpretation;
  identifying vulnerabilities in said software application; and
  securing said vulnerabilities in said software application, wherein said step of verifying the correctness of safety states further comprises the step of:

using bounded model checking to verify said correctness of said safety states, and
further wherein said step of using bounded model checking to verify said correctness of said safety states further comprises the steps of:
generating an assertion based on said abstract interpretation; testing said assertion to identify counterexamples; and
negating counterexamples until said assertion becomes unsatisfiable.

2. The method of claim 1, wherein said step of generating an abstract interpretation further comprises the steps of:
providing a type qualifier for each variable associated with at least one function within said software application; and
providing a precondition for each of said at least one function within said software application.

3. The method of claim 2, wherein said step of verifying said correctness of safety states further comprises the step of:
evaluating said type qualifiers and said preconditions to identify vulnerabilities in said software application.

4. The method of claim 2, wherein said type qualifier associates a security class with each corresponding variable.

5. The method of claim 1, further comprising the step of:
inserting statements into, or modifying existing statements within, said software application to secure vulnerabilities which are identified as a result of said verifying step.

6. The method of claim 5, wherein said step of inserting or modifying statements further comprises the step of:
inserting at least one of said statements at each location associated with an insecure variable.

7. The method of claim 5, wherein said step of inserting or modifying statements further comprises the step of:
inserting at least one of said statements at a subset of locations associated with an insecure variable.

8. The method of claim 7, wherein said subset of locations is determined by:
determining a minimum fixing set associated with vulnerabilities identified by said verifying step.

9. The method of claim 1, wherein said at least one function includes sensitive functions in said software application.

10. The method of claim 9, wherein said software application is a Personal Home Page (PHP) application and said sensitive functions include an exec( ) function, which executes system commands, and an echo( ) function, which generates outputs.

11. The method of claim 1 wherein said steps of generating and verifying are performed without running said software application.

12. A non-transitory computer-readable medium containing program instructions which, when executed by at least one processor, perform the steps of:
statically generating an abstract interpretation of a software application which approximates runtime states of said software, wherein said abstract interpretation preserves said software application's information flow properties;
verifying a correctness of safety states of the abstract interpretation;
identifying vulnerabilities in said software application; and
securing said vulnerabilities in said software application, wherein said step of verifying the correctness of safety states further comprises the step of:
using bounded model checking to verify said correctness of said safety states, and
further wherein said step of using bounded model checking to verify said correctness of said safety states further comprises the steps of:
generating an assertion based on said abstract interpretation; testing said assertion to identify counterexamples; and
negating counterexamples until said assertion becomes unsatisfiable.

13. The non-transitory computer-readable medium of claim 12, wherein said step of generating an abstract interpretation further comprises the steps of:
providing a type qualifier for each variable associated with at least one function within said software application; and
providing a precondition for each of said at least one function within said software application.

14. The non-transitory computer-readable medium of claim 13, wherein said step of verifying said correctness of safety states further comprises the step of:
evaluating said type qualifiers and said preconditions to identify vulnerabilities in said software application.

15. The non-transitory computer-readable medium of claim 13, wherein said type qualifier associates a security class with each corresponding variable.

16. The non-transitory computer-readable medium of claim 12, further comprising the step of:
inserting statements into, or modifying statements within, said software application to secure vulnerabilities which are identified as a result of said verifying step.

17. The non-transitory computer-readable medium of claim 16, wherein said step of inserting or modifying statements further comprises the step of:
inserting at least one of said statements at each location associated with an insecure variable.

18. The non-transitory computer-readable medium of claim 16, wherein said step of inserting or modifying statements further comprises the step of:
inserting at least one of said statements at a subset of locations associated with an insecure variable.

19. The non-transitory computer-readable medium of claim 18, wherein said subset of locations is determined by:
determining a minimum fixing set associated with vulnerabilities identified by said verifying step.

20. The non-transitory computer-readable medium of claim 12, wherein said at least one function includes sensitive functions in said software application.

21. The non-transitory computer-readable medium of claim 20, wherein said software application is a Personal Home Page (PHP) application and said sensitive functions include an exec( ) function, which executes system commands, and an echo( ) function, which generates outputs.

22. A method for analyzing a software application performed by at least one processor comprising the steps of:
generating type qualifiers and preconditions for variables and functions, respectively, within said software application;
identifying insecure information flows using said type qualifiers and preconditions;
calculating counterexample traces for the identified insecure information flows;
determining root causes of errors using said counterexample traces; and
determining patching points for said software application based on said root causes of errors.

23. A non-transitory computer-readable medium device that contains program instructions stored thereon which, when executed by at least one processor, perform the steps of:

generating a representation of a target software program which is an approximation of runtime states of said target software program which impact security of said target software program;
  wherein said representation includes type qualifiers which represent variables in said target software program and preconditions which represent functions in said target software program;
  wherein each of said type qualifiers associates a security class with a corresponding variable in said target software program;
verifying a correctness associated with at least some of said runtime states of said target software program using a bounded model checking technique; and
outputting information associated with security vulnerability in said target software program based on said verifying step.

* * * * *